US010885368B2

(12) United States Patent
Qiao et al.

(10) Patent No.: US 10,885,368 B2
(45) Date of Patent: Jan. 5, 2021

(54) SIX-DIMENSIONAL SMART TARGET

(71) Applicant: Government of the United States of America, as represented by the Secretary of Commerce, Gaithersburg, MD (US)

(72) Inventors: Guixiu Qiao, Boyds, MD (US); Craig Schlenoff, Germantown, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 61 days.

(21) Appl. No.: 16/409,085

(22) Filed: May 10, 2019

(65) Prior Publication Data
US 2019/0354790 A1 Nov. 21, 2019

Related U.S. Application Data

(60) Provisional application No. 62/672,270, filed on May 16, 2018.

(51) Int. Cl.
*G06T 7/246* (2017.01)
*F21K 9/61* (2016.01)
*G06T 7/292* (2017.01)
*G06K 9/32* (2006.01)
*G06K 9/00* (2006.01)
*G06T 17/10* (2006.01)

(52) U.S. Cl.
CPC .............. *G06K 9/3241* (2013.01); *F21K 9/61* (2016.08); *G06K 9/00201* (2013.01); *G06T 7/246* (2017.01); *G06T 7/292* (2017.01); *G06T 17/10* (2013.01)

(58) Field of Classification Search
CPC combination set(s) only.
See application file for complete search history.

(56) References Cited

U.S. PATENT DOCUMENTS

| 3,215,391 | A | * | 11/1965 | Storm | .................. F16M 11/046 248/396 |
| 2006/0182327 | A1 | * | 8/2006 | Mundy | .............. G06K 9/00503 382/132 |
| 2010/0220390 | A1 | * | 9/2010 | Wein | .................... G02B 27/644 359/429 |

(Continued)

OTHER PUBLICATIONS

Tsumaki, "A Distance-Error Detection and Correction System for Camera-Arm Control", 2014 World Automation Congress (WAC), Oct. 27, 2014, pp. 1-4.*

(Continued)

*Primary Examiner* — Omar S Ismail
(74) *Attorney, Agent, or Firm* — Office of Chief Counsel for National Institute of Standards and Technology

(57) ABSTRACT

A six-dimensional smart target determines pose of an object and includes: a gimbal with an azimuthal base and an elevation arm; an elevation member on the elevation arm that has light pipes; and an azimuthal member with light pipes such that the elevation member rotates at a rotary center about an elevation axis and azimuthal axis to consistently maintain the elevation member in a field of view of a measurement instrument.

18 Claims, 15 Drawing Sheets

(56) References Cited

U.S. PATENT DOCUMENTS

2016/0360096 A1* 12/2016 Holmes ............... F16M 11/205

OTHER PUBLICATIONS

Nguyen, "A New Full Pose Measurement Method for Robot Calibration", Sensors, www.mdpi.com/journal/sensors, Jul. 16, 2013, pp. 9134-9141.*

Guixiu Qiao, "Quick Positional Health Assessment for Industrial Robot Prognostics and Health Management (PHM)", 2017 IEEE International Conference on Robotics and Automation (ICRA), Singapore, May 29-Jun. 3, 2017, pp. 1815-1819.*

Schares, "Improving accuracy of robot-guided 3D laser surface processing by workpiece measurement in a blink", Proc. SPIE 10525, High-Power Laser Materials Processing: Applications, Diagnostics, and Systems VII, 1052508, Feb. 15, 2018, pp. 6-8.*

Tian Wei, "Determination of optimal samples for robot calibration based on error similarity", Chinese Journal of Aeronautics, Published on—Apr. 2, 2015, pp. 949-951.*

Qiao, G., et al., "Quick health assessment for industrial robot health degradation and the supporting advanced sensing development", Journal of Manufacturing Systems, 2018, p. 51-59, vol. 48.

* cited by examiner (A)

(B)

(C)

SIX-DIMENSIONAL SMART TARGET

CROSS REFERENCE TO RELATED APPLICATIONS

The application claims priority to U.S. Provisional Patent Application Ser. No. 62/672,270 filed May 16, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov.

BRIEF DESCRIPTION

Disclosed is a six-dimensional smart target for dynamically determining pose of an object, the six-dimensional smart target comprising: a gimbal comprising: an azimuthal base that provides an azimuthal axis; an elevation arm disposed on and in rotary communication with the azimuthal base and that: extends from the azimuthal base, rotates about the azimuthal axis, and provides an elevation axis; and a rotary center provided by an intersection of the azimuthal axis and the elevation axis; an elevation member disposed on the elevation arm of the gimbal at the rotary center of the gimbal and in rotary communication with the elevation arm, the elevation member comprising: a first light pipe comprising an elongated body disposed axially along the elevation axis with a first end connected to the elevation arm and that: receives first light and uniformly distributes the first light along the first light pipe to illuminate peripheral edges of the first light pipe; and a second light pipe disposed on the first light pipe and arranged with the second light pipe intersecting the first light pipe at the rotary center such that the second light pipe receives the first light from the first light pipe and uniformly distributes the first light along the second light pipe to illuminate peripheral edges of the second light pipe, the second light pipe comprising an elongated body disposed axially at an oblique angle to the first light pipe and the elevation axis; an azimuthal member comprising: the azimuthal base; a y-axis light pipe disposed on the azimuthal base and comprising an elongated body disposed axially along a y-direction that is perpendicular to the azimuthal axis with a second end connected to the azimuthal base and that: receives a second light and uniformly distributes the second light along the y-axis light pipe to illuminate peripheral edges of the y-axis light pipe; and a z-axis light pipe disposed on the azimuthal base and comprising an elongated body disposed axially along a z-direction that is perpendicular to the azimuthal axis and the y-direction, with a third end connected to the azimuthal base such that the z-axis light pipe: receives a third light and uniformly distributes the third light along the z-axis light pipe to illuminate peripheral edges of the z-axis light pipe, wherein the elevation member rotates at the rotary center about the elevation axis and the azimuthal axis to consistently maintain the first light pipe and the second light pipe in a field of view of a measurement instrument that views the six-dimensional smart target.

Disclosed is a process for determining a pose of an object with the six-dimensional smart target, the process comprising: disposing the six-dimensional smart target on object so that six-dimensional smart target moves synchronously with object; receiving a first image of the six-dimensional smart target from a first camera; detecting the six-dimensional smart target from a background environment in which the is disposed; determining an area of interest of the six-dimensional smart target; determining peripheral edges of the first light pipe; determining peripheral edges of the second light pipe; determining peripheral edges of the y-axis light pipe; determining peripheral edges of the z-axis light pipe; determining, from the peripheral edges of the first light pipe, a first center line.1 of first light pipe; determining, from the peripheral edges of the second light pipe, a second center line.2 of second light pipe; determining, from the peripheral edges of the y-axis light pipe, a third center line.3 of y-axis light pipe; determining, from the peripheral edges of the z-axis light pipe, a fourth center line.4 of z-axis light pipe; determining an elevation intersection of the first center line.1 and the second center line.2; determining, from the elevation intersection, the rotary center; determining, from the rotary center, the third center line.3, and the fourth center line.4, a three-dimensional coordinate frame for the six-dimensional smart target to determine the pose of the object, the three-dimensional coordinate frame comprising: an origin that is disposed at the rotary center; a principal y-axis parallel to the y-direction and arranged to intersect the origin; a principal z-axis parallel to the z-direction and arranged to intersect the origin; and a principal x-axis parallel to the azimuthal axis and arranged to intersect the origin.

BRIEF DESCRIPTION OF THE DRAWINGS

The following description should not be considered limiting in any way. With reference to the accompanying drawings, like elements are numbered alike.

DETAILED DESCRIPTION

Figure 1:
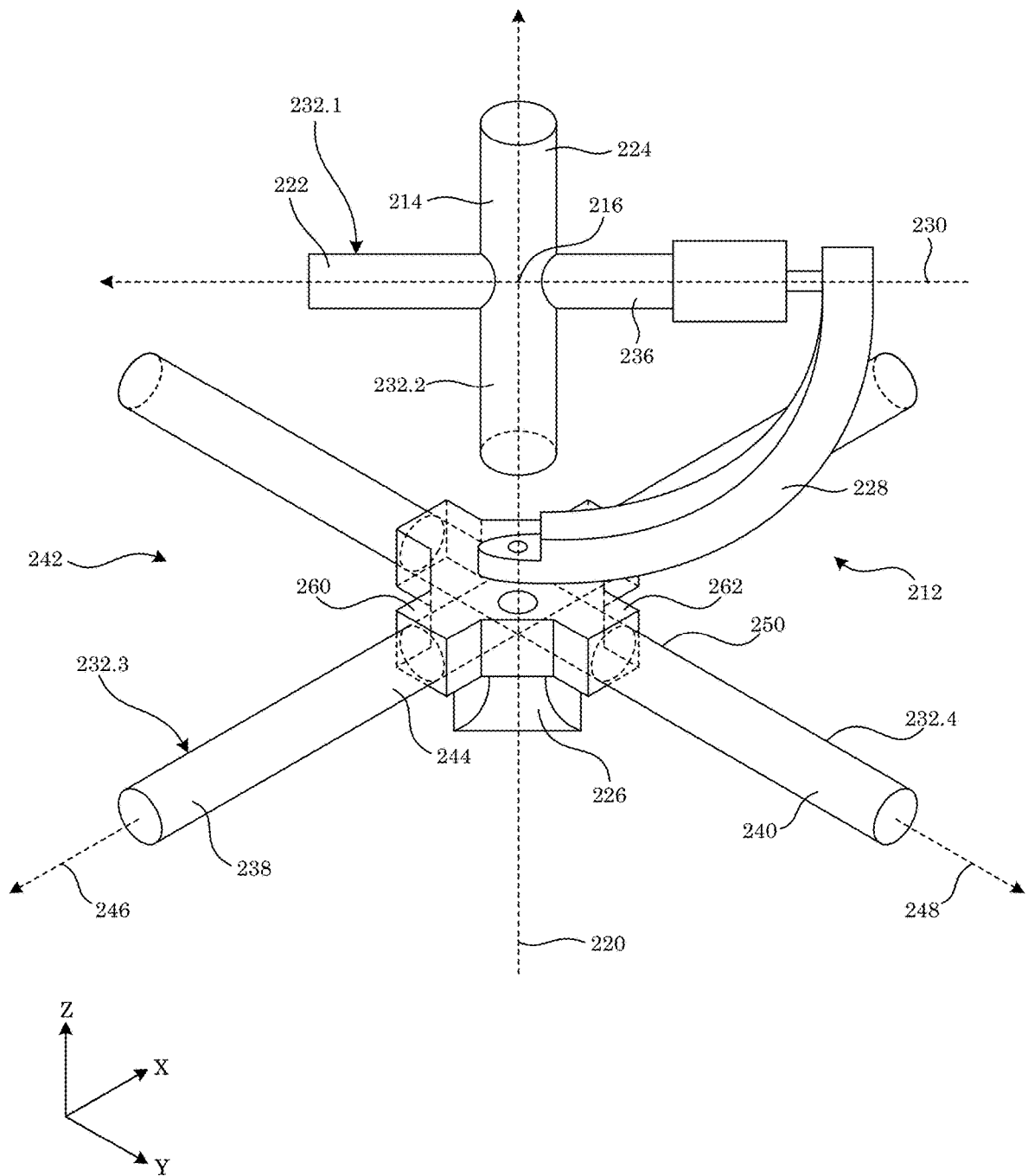
FIG. 1 shows a perspective view of a six-dimensional smart target.

A detailed description of one or more embodiments is presented herein by way of exemplification and not limitation.

It has been discovered that a six-dimensional smart target herein provides six-dimensional (6-D) information of a moving object (x, y, z, pitch, yaw, and roll) with high accuracy and can be used, e.g., in a vision agnostic system to acquire the six-dimensional (6-D) information of the moving object (x, y, z, pitch, yaw, and roll) with high accuracy. The six-dimensional smart target is motorized to maintain an elevation member of the six-dimensional smart target in a field of view a measurement instrument that views the six-dimensional smart target, wherein the six-dimensional smart target rotates toward the measurement instrument for a non-blocking dynamic measurement. Advantageously, the six-dimensional smart target in a vision agnostic system provides precise 6-D information of an object with precision localization, including registering multiple objects, adaptively locating objects for unplanned adaptive control, precisely tracking a pose of an object used by robot operations, and applications in machine and robot visions. Measured 6-D information also can be used as feedback control for motion, relative position or orientation monitoring of objects, data registration for in-process inspection, and the like.

Six-dimensional smart target 200 dynamically determines a pose of object 210. In an embodiment, with reference to FIG. 1, FIG. 2, FIG. 3, FIG. 4, and FIG. 5, six-dimensional smart target 200 includes gimbal 212. Gimbal 212 includes azimuthal base 226 that provides azimuthal axis 220. Elevation arm 228 is disposed on and is in rotary communication with azimuthal base 226, wherein elevation arm 228 extends from azimuthal base 226, rotates about azimuthal axis 220, and provides an elevation axis 230. Rotary center 216 is provided by an intersection of azimuthal axis 220 and elevation axis 230, Elevation member 214 is disposed on elevation arm 228 of gimbal 212 at rotary center 216 of gimbal 212. Elevation member 214 is in rotary communication with elevation arm 228 and includes first light pipe 222. First light pipe 222 has an elongated body disposed axially along elevation axis 230 with first end 236 connected to elevation arm 228, wherein first light pipe 222 receives a first light and uniformly distributes the first light along first light pipe 222 to illuminate peripheral edges 232.1 of first light pipe 222. Second light pipe 224 is disposed on first light pipe 222 and arranged with second light pipe 224 intersecting first light pipe 222 at rotary center 216 such that second light pipe 224 receives the first light from first light pipe 222 and uniformly distributes the first light along second light pipe 224 to illuminate peripheral edges 232.2 of second light pipe 224. Second light pipe 224 includes an elongated body disposed axially at an oblique angle to first light pipe 222 and elevation axis 230. Six-dimensional smart target 200 also includes azimuthal member 242 that includes azimuthal base 226; y-axis light pipe 238 disposed on azimuthal base 226. Y-axis light pipe 238 includes an elongated body disposed axially along y-direction 246 that is perpendicular to azimuthal axis 220 with second end 244 connected to azimuthal base 226, wherein y-axis light pipe 238 receives a second light and uniformly distributes the second light along y-axis light pipe 238 to illuminate peripheral edges 232.3 of y-axis light pipe 238. Z-axis light pipe 240 is disposed on azimuthal base 226 and includes an elongated body disposed axially along z-direction 248 that is perpendicular to azimuthal axis 220 and y-direction 246, with third end 250 connected to azimuthal base 226. Z-axis light pipe 240 receives a third light and uniformly distributes the third light along z-axis light pipe 240 to illuminate peripheral edges 232 of z-axis light pipe 240. In this manner, elevation member 214 rotates at rotary center 216 about elevation axis 218 and azimuthal axis 220 to consistently maintain first light pipe 222 and second light pipe 224 in a field of view of a measurement instrument that views six-dimensional smart target 200.

Figure 11:
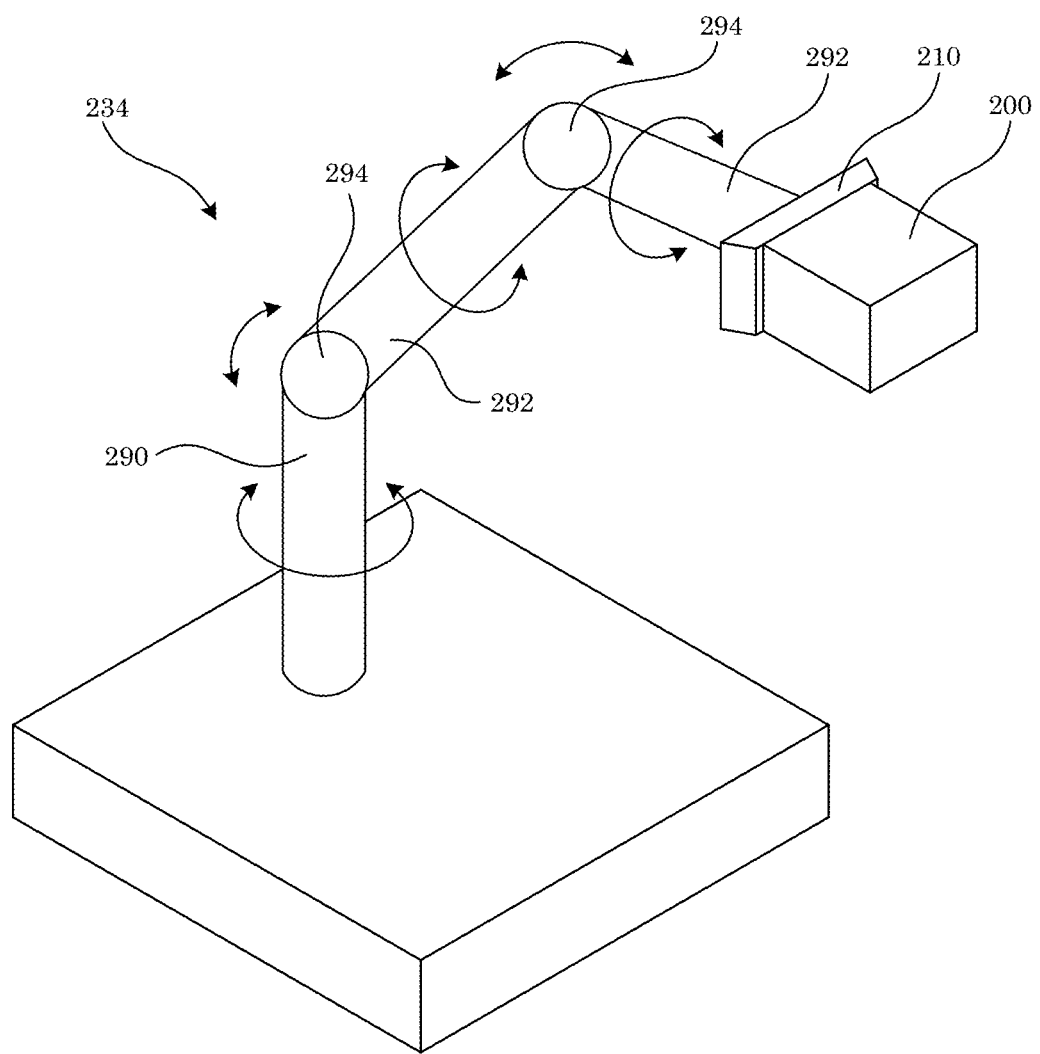
FIG. 11 shows a six-dimensional smart target disposed on a robot 234.

Six-dimensional smart target 200 can include orientation sensor 252 interposed between elevation member 214 and elevation arm 228, and elevation adjuster 254 interposed between elevation member 214 and elevation arm 228. For rotary manipulation of elevation member 214, six-dimensional smart target 200 includes bearing 256 interposed between elevation member 214 and elevation arm 228; and elevation motor 258 interposed between elevation member 214 and elevation arm 228. Y-direction adjuster 260 can be interposed between azimuthal base 226 and y-axis light pipe 238, and z-direction adjuster 262 can be interposed between azimuthal base 226 and z-axis light pipe 240. Moreover, azimuthal adjuster 264 can be interposed between azimuthal base 226 and elevation arm 228 with bearing 266 interposed between azimuthal base 226 and elevation arm 228. Azimuthal flange 268 is disposed on azimuthal base 226 to connect azimuthal base 226 to object 210, e.g., robot 234 as shown in FIG. 11. Controller 270 can be disposed on azimuthal base 226 with azimuthal motor 272 disposed on azimuthal base 226.

Figure 6:
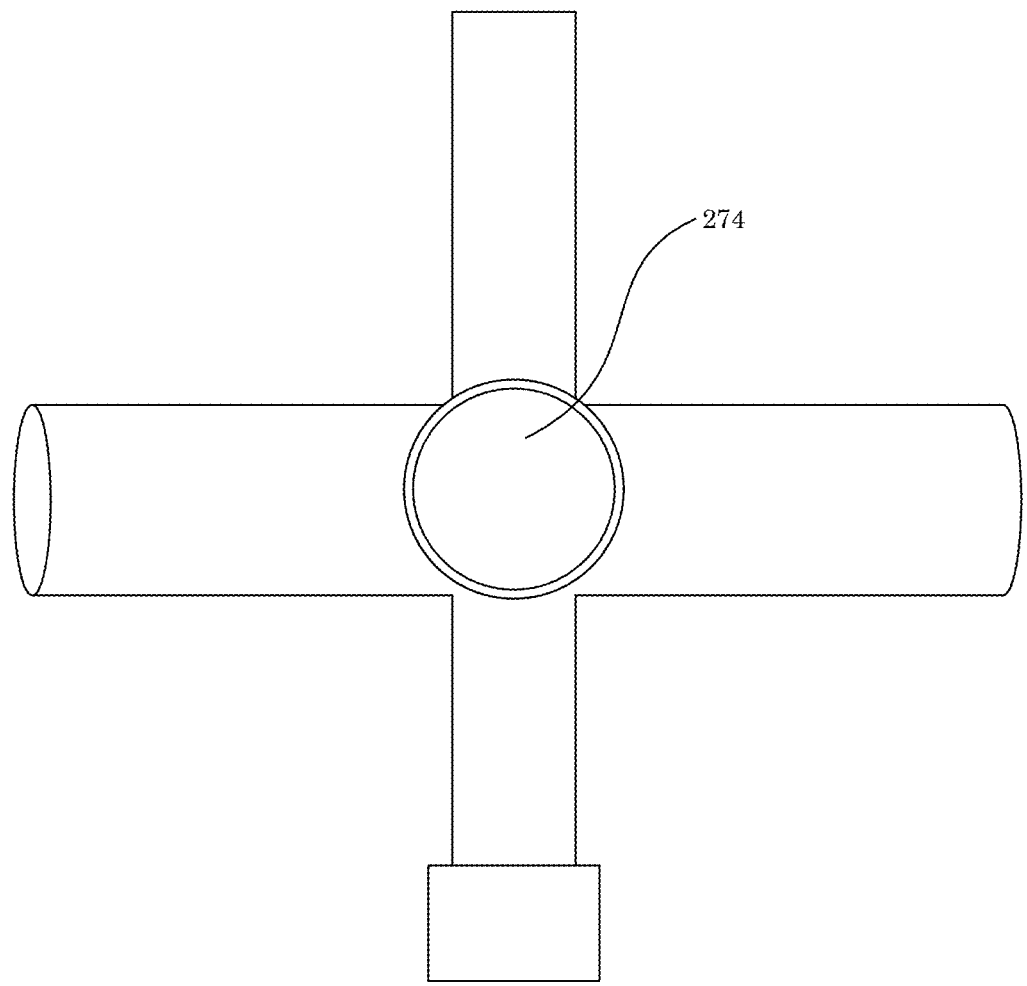
FIG. 6 shows a reflector disposed on an elevation member for a six-dimensional smart target.

In an embodiment, with reference to FIG. 6, six-dimensional smart target 200 includes reflector 274 disposed on elevation member 214 proximate to and centered on rotary center 216.

Six-dimensional smart target 200 dynamically determines a pose of object 210. Object 210 can include objects used within robot or machine operations to locate parts during mobile operations and can reach to certain positions with designed orientations. Moreover, the accuracy of the object's pose is to be controlled to prevent operation failures. In an embodiment, with reference to FIG. 11, object 210 is an end effector of robot 234. Exemplary robots 234 include base, arm articulations, kinematic links, and the like. Robot 234 can include armpiece 290 disposed on a base and in communication with articulated arm 292 via arm articulation 294. At a terminal articulated arm 292, object 210 can be disposed and receive six-dimensional smart target 200. It should be appreciated that the pose of object 210 can be determined by six dimensions that include x, y, z, pitch, yaw, and roll. Accordingly, six-dimensional smart target 200 provides determination of the six dimensions by principal y-axis 282, principal z-axis 284, principal x-axis 286, and orientation sensor 252.

In six-dimensional smart target 200, gimbal 212 includes elevation arm 228 in rotary communication with azimuthal base 226. Elevation arm 228 can include elevation motor, and bearing to support the elevation member rotate about elevation axis. Moreover, elevation arm can rotate about azimuthal axis. A size of elevation arm 228 can be any selected size, e.g., from 30 mm to 500 mm or even larger, specifically from 60 mm to 200 mm, and more specifically from 100 mm to 150 mm. Elevation arm 228 can rotate about azimuthal axis 220 in an angular range from 0 radians to $2\pi$ radians. In an embodiment, elevation arm 228 is supported by bearing 266 so elevation arm 228 rotates about azimuthal axis 220 and through 360°. Azimuthal adjuster 264 connects to an inner shaft of bearing 266. A runout offset of rotary center 216 of elevation member 214 about azimuthal axis 220 is removed by azimuthal adjuster 264. Azimuthal motor 272 is in rotary communication with elevation arm 228 and is fixed with respect to a bottom housing and drives elevation arm 228 and elevation member 214 to rotate about azimuthal axis 220.

Slip rings disposed on elevation adjuster 254 and azimuthal adjuster 264 dynamically provide electrical connection and unlimited 360° rotation in elevation and azimuth.

Six-dimensional smart target 200 includes a plurality of light pipes (222, 224, 238, 240). Light pipes (222, 224, 238, 240) independently can include, e.g., peripheral edges 232, uniformly lighted surface, and three LED colors to enable center line detection to construct a coordinate frame that represents six-dimensional information. Light pipes (222, 224, 238, 240) independently can have a shape such as a cylinder, cone, blunted cone, symmetrical 3D shape created by rotating about a center line, and the like. A length of light pipes (222, 224, 238, 240) independently can be from 20 mm to 300 mm or even larger, specifically from 50 mm to 150 mm, and more specifically from 60 mm to 120 mm. A cross-sectional diameter of pipes (222, 224, 238, 240) independently can be from 4 mm to 50 mm or even larger (but not limited to 50 mm), specifically from 5 mm to 30 mm, and more specifically from 8 mm to 15 mm.

Figure 7:
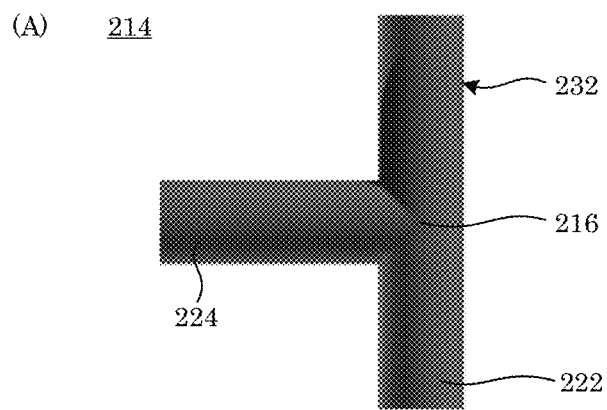
FIG. 7 shows, in panel A, an elevation member with a first light pipe and second light pipe; shows elevation members, in panel B and panel C, with a first light pipe and a plurality of second light pipes.
Figure 7:
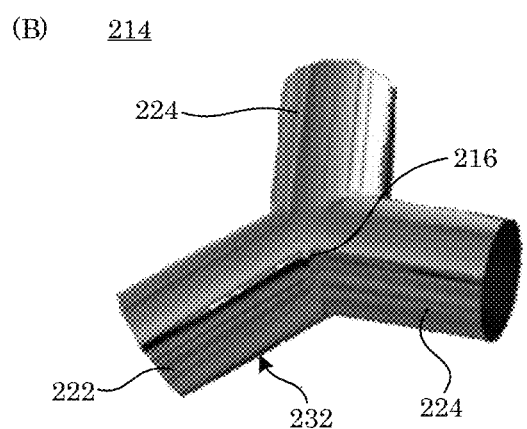
Figure 7:
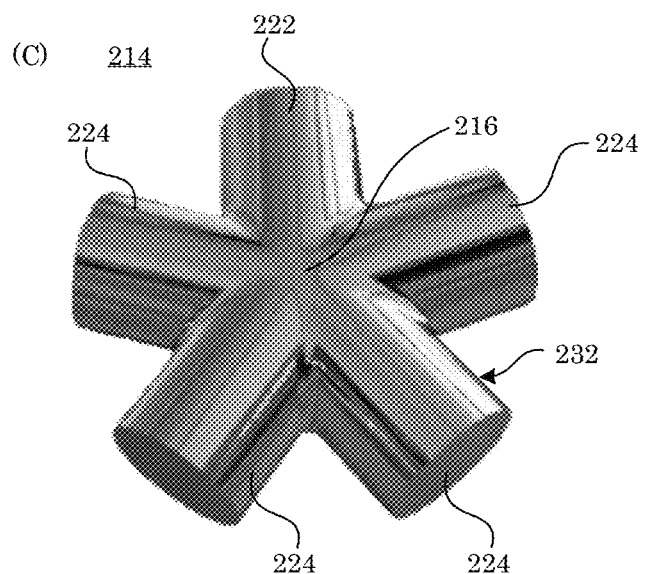

First light pipe 222 and second light pipe 224 in combination provide elevation member 214. Elevation member 214 can include peripheral edges 232, uniformly lighted surface, and three LED colors to enable center line detection. Moreover, intersection of the center lines can create a point to represent the origin of a coordinate frame. Elevation member 214 can include an arbitrary number of light pipes that intersect in an arbitrary angle, e.g., as shown in FIG. 7.

In an embodiment, with reference to FIG. 6, reflector 274 is disposed on elevation member 214. Reflector 274 can include a retroreflector, spherically mounted retroreflector, or corner cube to enable the use by laser trackers directly measuring the center (x, y, z). In an embodiment, reflector 274 is a retro-reflector that is disposed proximate to rotary center 216 of elevation member 214 an in communication with, e.g., a laser-vision based measurement instrument. A laser in the laser-vision based measurement instrument can measure 3-D positions of reflector 274. The vision part of the laser-vision based measurement instrument can obtain orientation information for 6-D measurement. Alignment of the laser-vision based measurement instrument provides disposal of reflector 274 at rotary center 216 of elevation member 214.

First light pipe 222 receives first light that illuminates first light pipe 222 and second light pipe 224. Accordingly, peripheral edges 232 of first light pipe 222 and second light pipe 224 are distinguished from a background environment in which six-dimensional smart target 200 is disposed by a contrast in a selected color or intensity of emission. In that respect, first light can have a selected wavelength, e.g., from 600 nm to 650 nm, specifically from 642 nm to 648 nm, and more specifically from 644 nm to 646 nm, although not limited to recited wavelength or intensity. The wavelength or intensity can distinguish a background environment. It is contemplated that the first light can be continuous or modulated at a selected frequency, e.g., for phase sensitive detection of the first light and enhancement of visual recognition of peripheral edges 232 of elevation member 214 over the background environment.

Y-axis light pipe 238 and z-axis light pipe 240 are disposed on azimuthal base 226 to provide respectively y-direction 246 and z-axis light pipe 240. Y-axis light pipe 238 receives the second light, and z-axis light pipe 240 receives the third light. The second light and third light respectively illuminate y-axis light pipe 238 and z-axis light pipe 240. Accordingly, peripheral edges 232 of first light pipe 222 and second light pipe 224 are distinguished from each, peripheral edges 232 of elevation member 214, and the background environment in which six-dimensional smart target 200 is disposed by a contrast in selected colors or intensity of emission of the second light and the third light. In that respect, the second light and third light independently can have a selected wavelength, e.g., the second light has from 500 nm to 550 nm, specifically from 517 nm to 523 nm, and more specifically from 519 nm to 521 nm; the third light has from 440 nm to 470 nm, specifically from 462 nm to 468 nm, and more specifically from 464 nm to 466 nm without limitation to recited wavelength or intensity because they are used to distinguish from a background environment. It is contemplated that the second light and third light independently can be continuous or modulated at a selected frequency, e.g., for phase sensitive detection of the first light and enhancement of visual recognition of peripheral edges 232 of y-axis light pipe 238 and z-axis light pipe 240 over the background environment.

Figure 12:
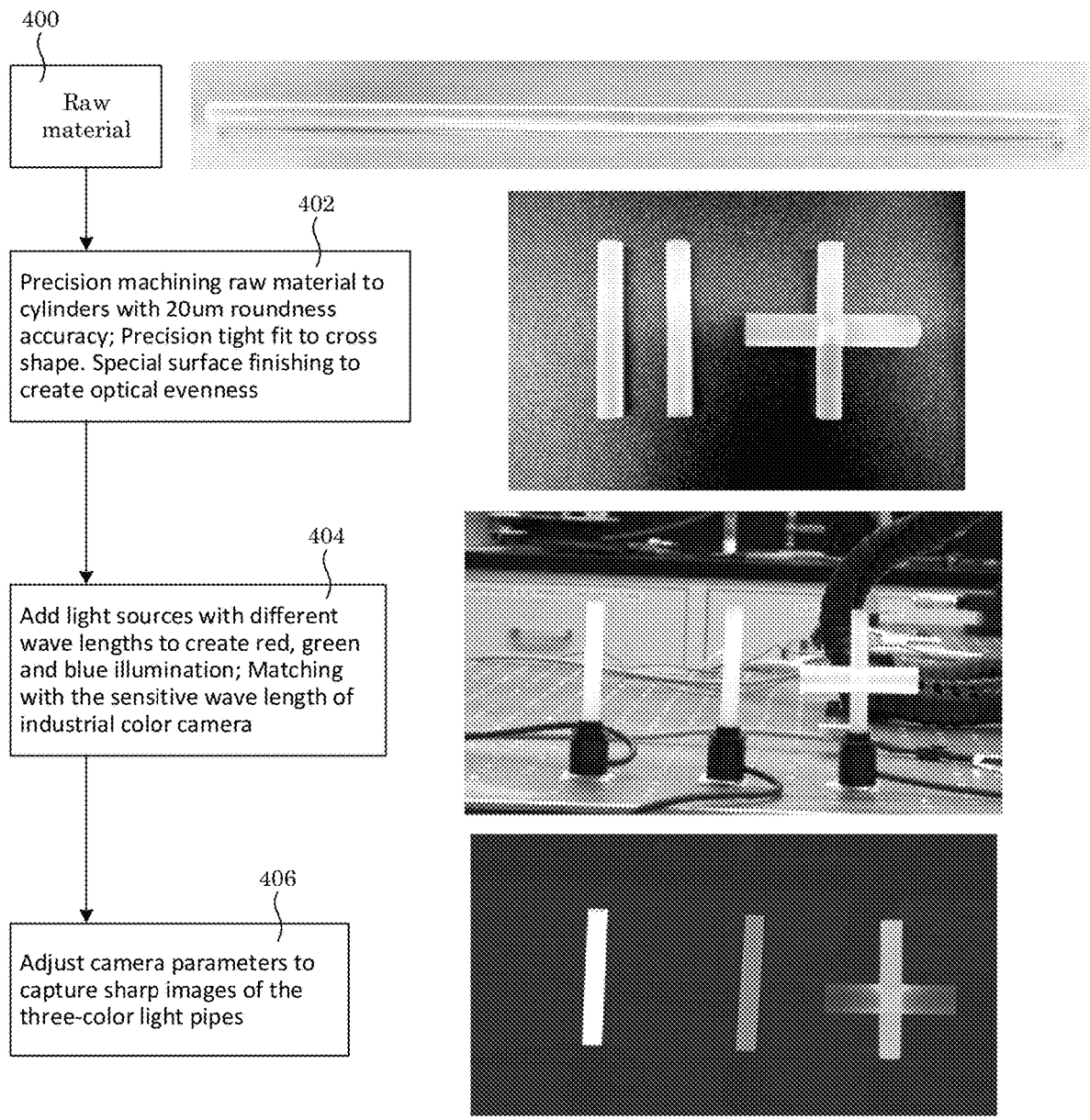
FIG. 12 shows a process for making a six-dimensional smart target.

It is contemplated that the first light, second light, and third light independently can be produced by a red, green, blue, and the like. In an embodiment, the first light is red; the second light is green, and the third light is blue. Three different colors of LEDs can be used. A wavelength of the first light, second light, and third light interpedently can be selected to match a narrow band filter of cameras of the measurement instrument to reduce ambient light effects. The bottom panel of FIG. 12 shows an image of elevation member 214, y-axis light pipe 238, and z-axis light pipe 240 with even lighting and sharply resolved peripheral edges 232. Quality and accuracy of elevation member 214, y-axis light pipe 238, and z-axis light pipe 240 provide accurate line features and image definition of six-dimensional smart target 200.

Additionally, to provide redundancy of direction measurement from different views of six-dimensional smart target 200, a plurality of y-axis light pipes 238 or z-axis light pipes 240 can be disposed in parallel on azimuthal base 226.

Azimuthal base 226 can include bearing, azimuthal motor, azimuthal flange and controller to support the elevation arm rotating about azimuthal axis.

Figure 2:
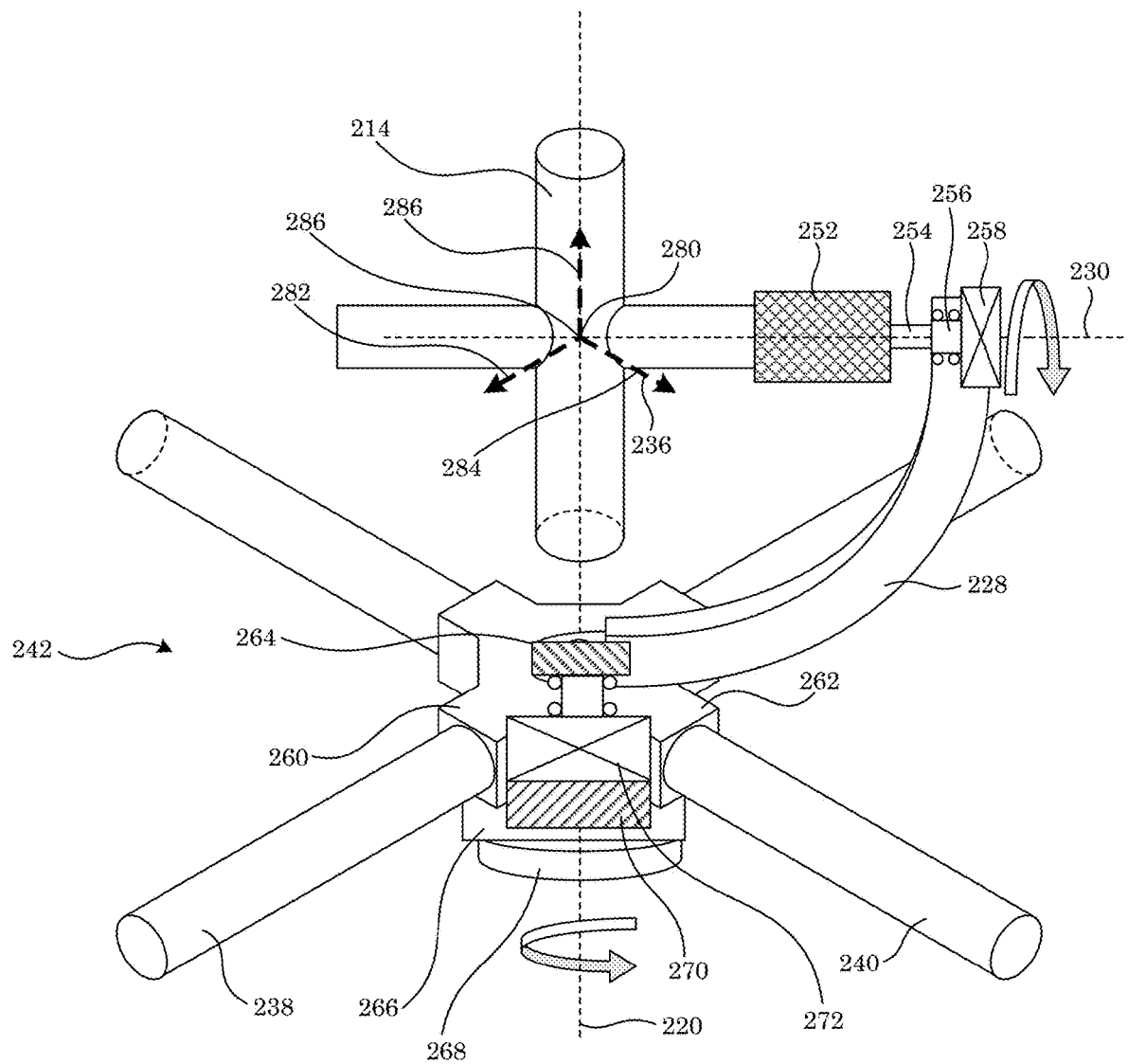
FIG. 2 shows a cut-away view of the six-dimensional smart target shown in FIG. 1.
Figure 3:
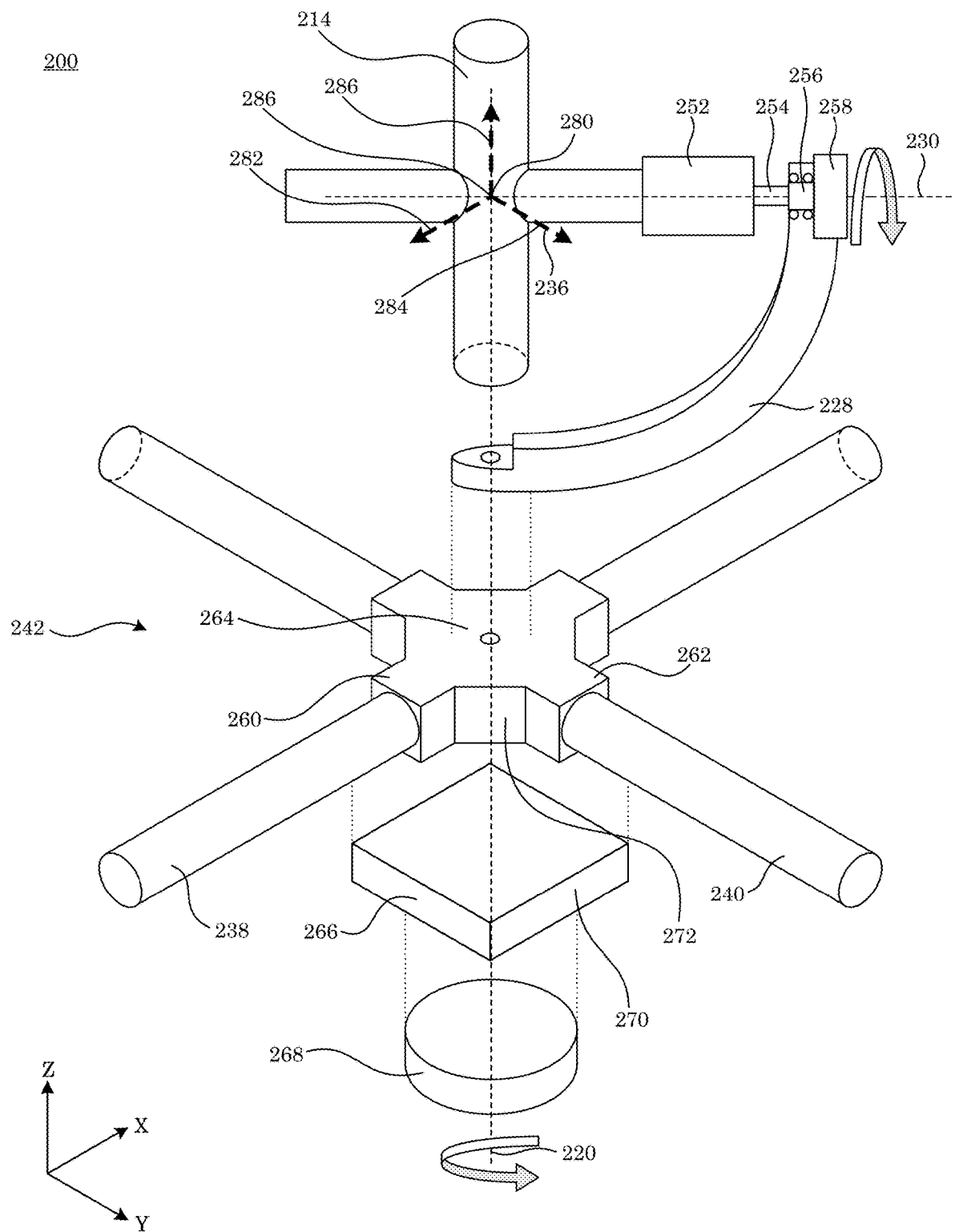
FIG. 3 shows an exploded view of the six-dimensional smart target shown in FIG. 1.
Figure 4:
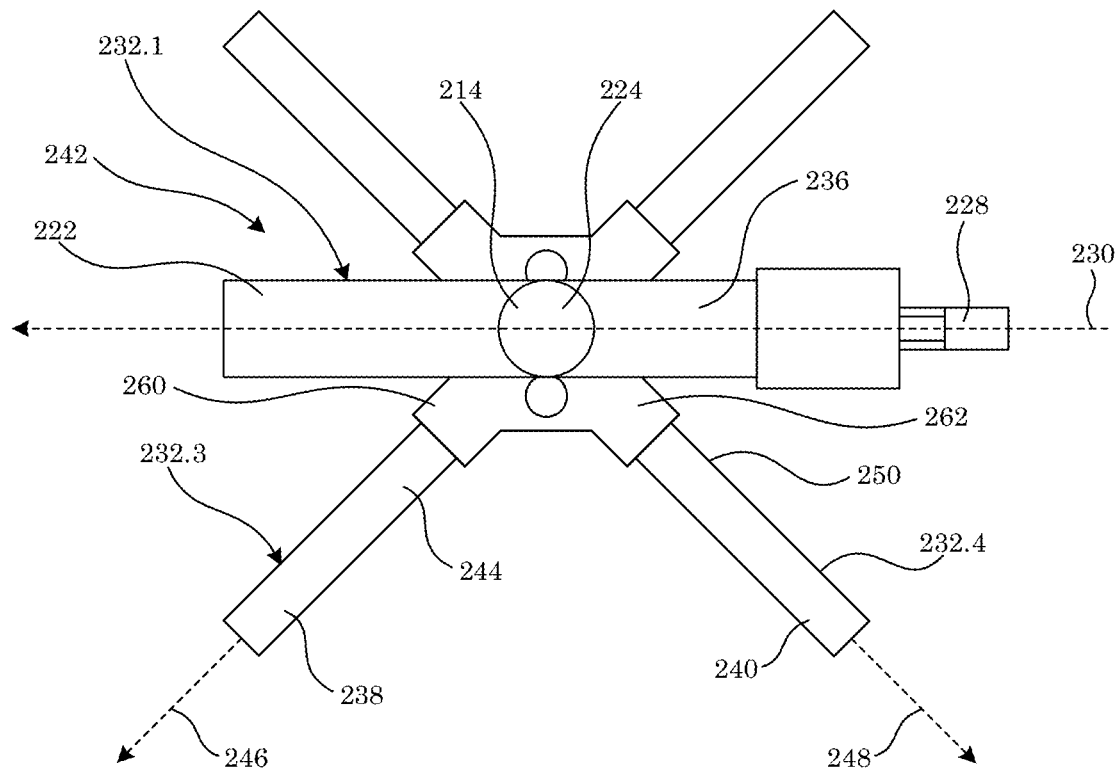
FIG. 4 shows an plan view of the six-dimensional smart target shown in FIG. 1.
Figure 4:
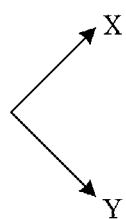
Figure 5:
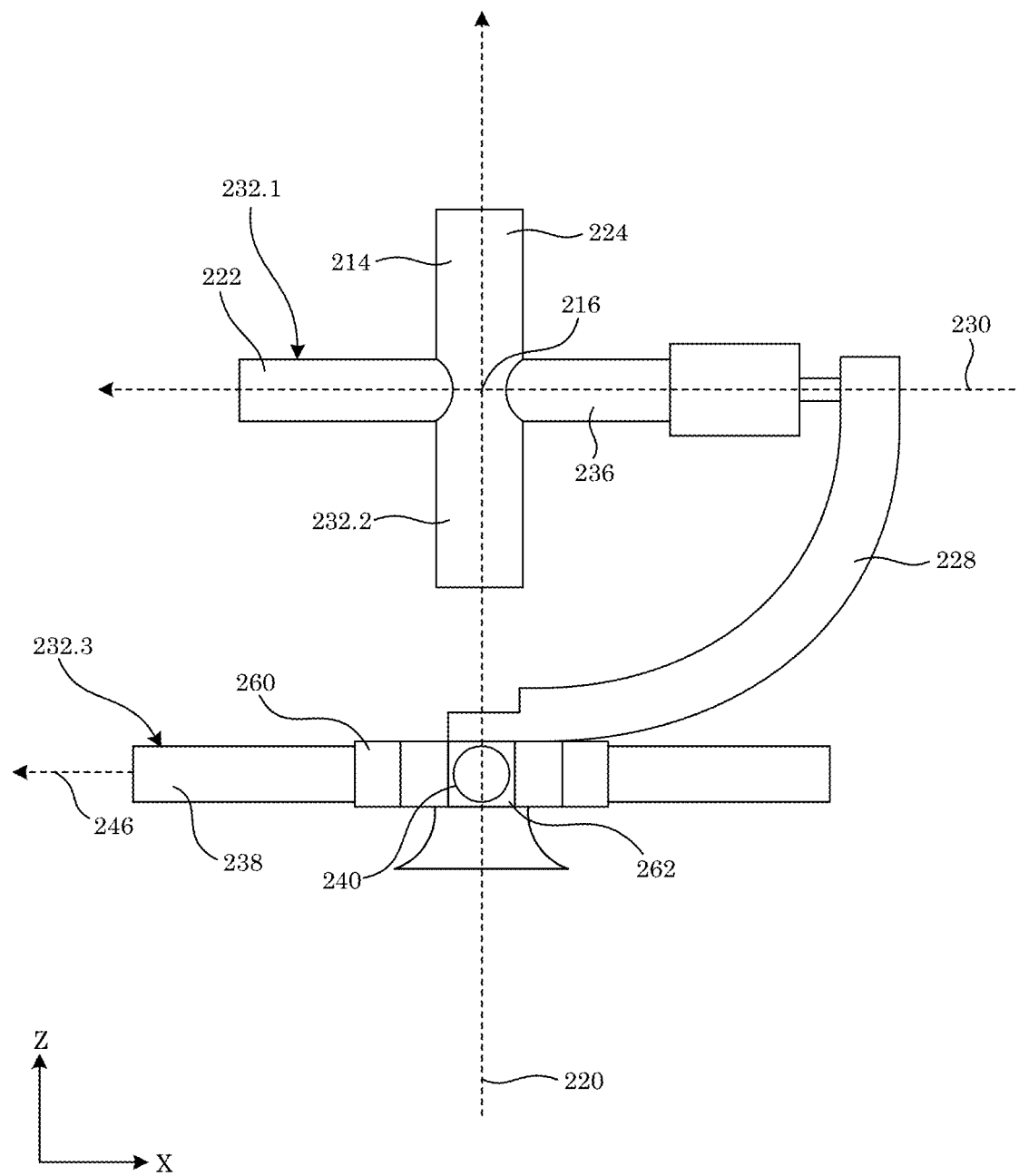
FIG. 5 shows a side view of the six-dimensional smart target shown in FIG. 1.
Figure 8:
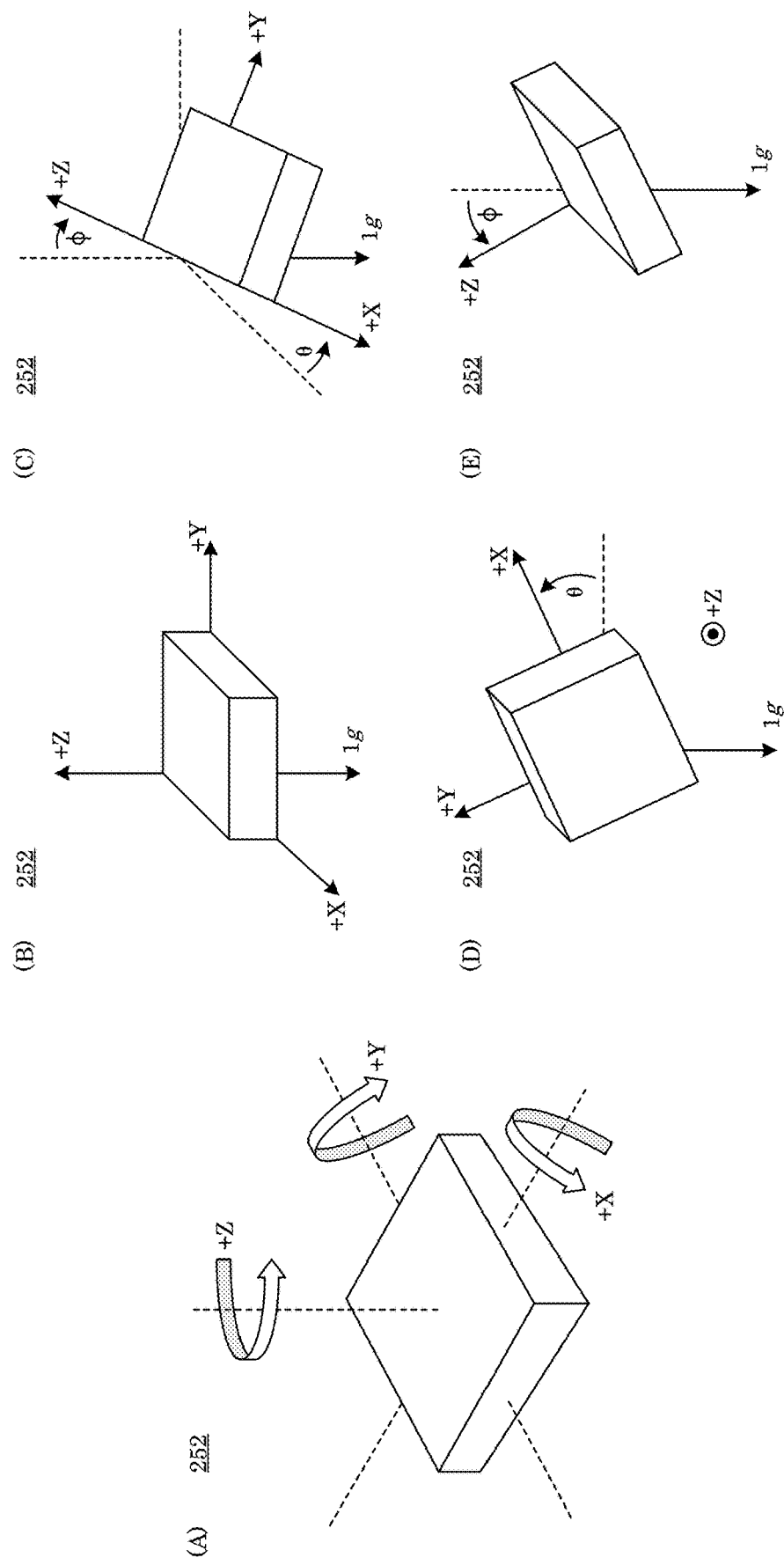
FIG. 8 shows, in panel A, an orientation sensor; shows, in panel B, the sensor has no angle output; shows, in panel C, sensor has angle ouput about x-axis and z-axis; shows, in panel D, sensor has angle output about z-axis; and shows, in panel E, sensor has angle output about x-axis.

Orientation sensor 252 is interposed between elevation member 214 and elevation arm 228 to determine an orientation of elevation member 214 relative to azimuthal base 226. The orientation of elevation member 214 provided by orientation sensor 252 includes pitch (rotation about principal x-axis 286), yaw (rotation about principal y-axis 282), and roll (rotation about principal z-axis 284) directions in three-dimensional coordinate frame 278 as shown in FIG. 2. Orientation sensor 252 can include sensor board and cables to detect the pose changes and can be, e.g., a level sensor, tilt sensor, gyro, inclinometer, accelerometer, and the like. With reference to FIG. 8, orientation sensor 252 can output angles to reflect pose changes in pitch, yaw, and roll. An initial pose of elevation member 214 is taught facing a measurement instrument such as vision system 298. To maintain elevation member 214 constantly facing to the measurement instrument, elevation member 214 maintains the initial pose or a taught pose. Electronic signals produced by orientation sensor 252 control motors (e.g., 258) to maintain the pose of elevation member 214.

Elevation adjuster 254 can be interposed between elevation member 214 and elevation arm 228 to perform adjustment and remove runout offsets of the rotary center about the elevation axis.

Bearing 256 can be interposed between elevation member 214 and elevation arm 228 to support the elevation member rotating about the elevation axis.

Figure 9:
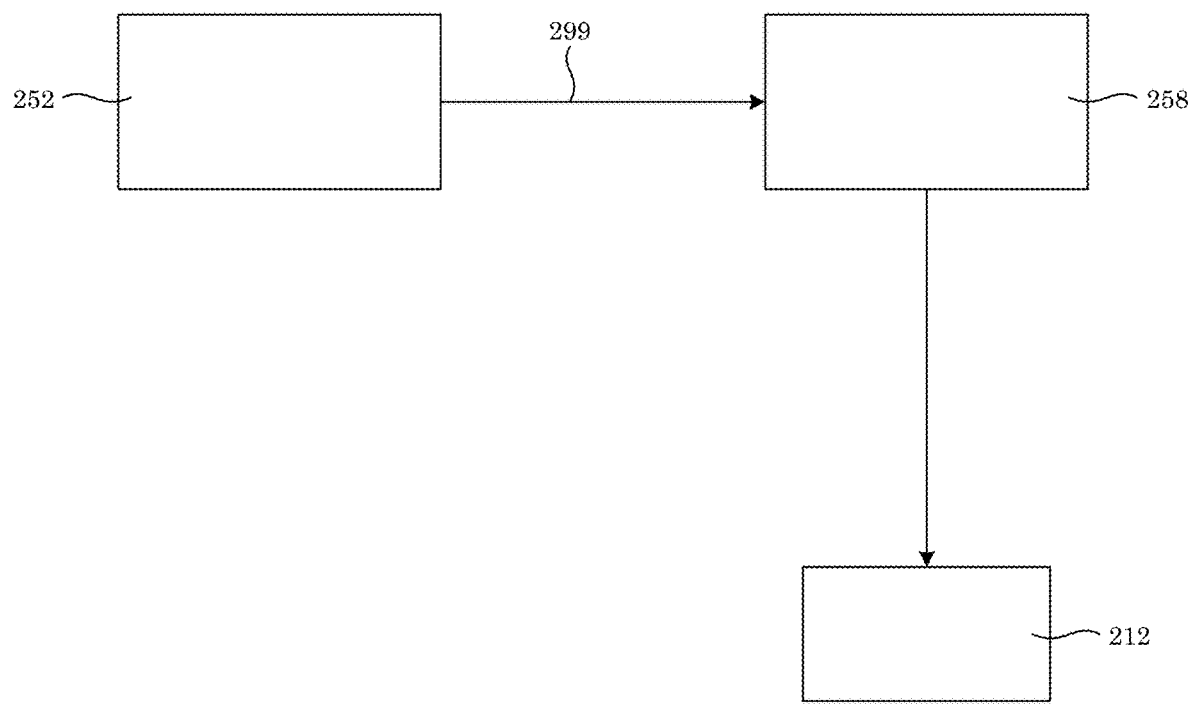
FIG. 9 shows communication between an orientation sensor, elevation motor, and gimbal.
Figure 10:
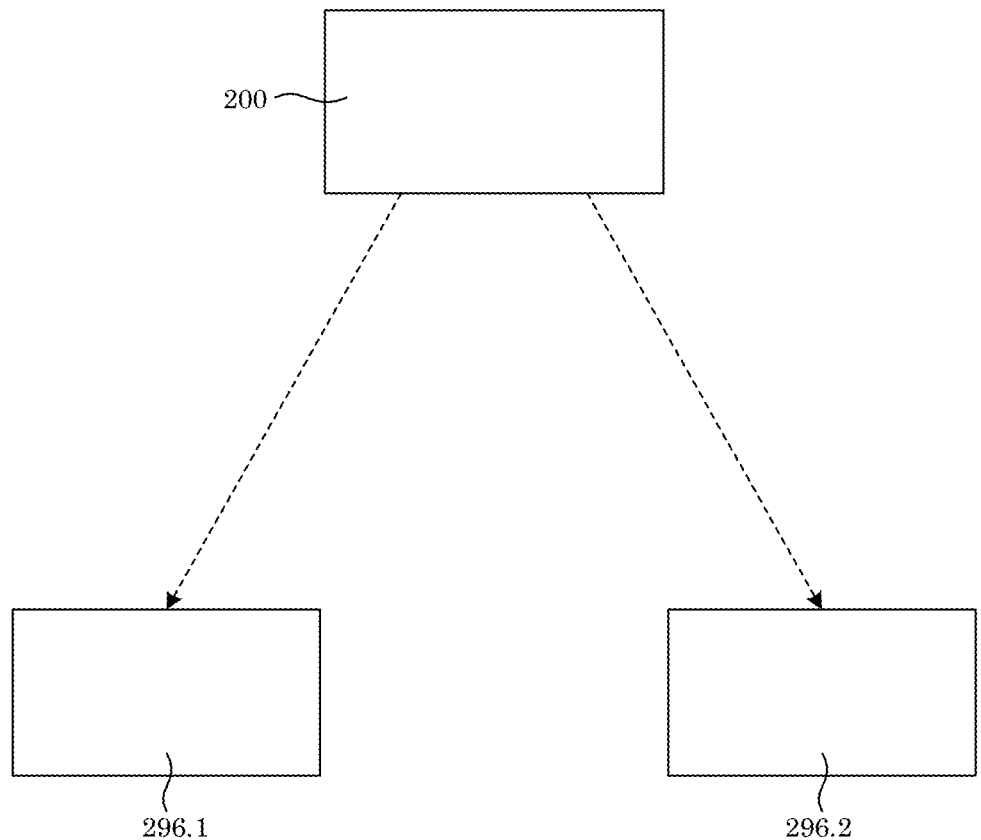
FIG. 10 shows a vision system that includes a six-dimensional smart target.

Elevation motor 258 can be interposed between elevation member 214 and elevation arm 228 to rotate the elevation member rotating about the elevation axis. Moreover, elevation motor can contain encoder to improve drive precision. In an embodiment, with reference to FIG. 9, orientation sensor 252 is in communication with elevation motor 258 and send orientation signal 299 to elevation motor 258, also, orientation sensor 252 is in communication with azimuthal motor and communicates an orientation signal to azimuthal motor, to drive the elevation member maintaining the initial pose. In this manner, elevation member 214 can be rotated to maintain elevation member 214 constant orientation and in a field of view, e.g., a vision system 298 as shown in FIG. 10. Vision system 298 can include a plurality of cameras 296 that image six-dimensional smart target 200. Vision system 298 can be a motion tracker 288.

Y-direction adjuster 260, z-direction adjuster 262, and azimuthal adjuster 264 can be interposed respectively between light pipes (238, 240) and elevation arm 228 and azimuthal base 226 to perform adjustment and remove offsets from design during assembly. Y-direction adjuster 260 aligns y-axis light pipe 238 so that y-direction 246 intersects azimuthal axis 220. Z-direction adjuster 262 aligns z-axis light pipe 240 so that z-direction 248 intersects azimuthal axis 220 and so that z-axis light pipe 240 is perpendicular to y-axis light pipe 238. After alignment, y-direction adjuster 260 and z-direction adjuster 262 are locked by tightening fasteners to prevent change in y-direction adjuster 260 and z-direction adjuster 262.

Bearing 266 can be interposed between azimuthal base 226 and elevation arm 228 to support the elevation arm rotating about the azimuthal axis.

Azimuthal motor 272 can be disposed on azimuthal base 226 to rotate the elevation arm rotating about the azimuthal axis. Moreover, azimuthal motor can contain encoder to improve drive precision.

Azimuthal flange 268 can be disposed on azimuthal base 226 to connect with different adaptors designed for different end effector tools. In this manner, azimuthal flange 268 provides rigid attachment to object 210 for synchronous communication of motion of object 210 to azimuthal base 226.

Controller 270 can be disposed on azimuthal base 226 to provide electronic control of the rotation sensor, motors, and power. In an embodiment, controller 270 includes electrical circuity to communicate with orientation sensor 252, elevation motor 258, and azimuthal motor 272. Orientation sensor 252 detects a change in pose of elevation member 214. Electrical signals are generated to drive elevation motor 258 and azimuthal motor 272 that can rotate clockwise or counter-clockwise respective about elevation axis 230 and azimuthal axis 220. Controller 270 controls activation of both elevation motor 258 and azimuthal motor 272 to maintain elevation member 214 facing to the measurement instrument at all times during operation. Controller 270 also can include a power source, e.g., a portable power source such as a battery, to provide power to orientation sensor 252, elevation member 214, light pipes (238, 240), elevation motor 258, and azimuthal motor 272. The battery can be rechargeable. Such power source can be self-contained within six-dimensional smart target 200 to avoid interference with the mobility of the target.

Six-dimensional smart target 200 can be made in various ways. In an embodiment, with reference to FIG. 12, a process for making six-dimensional smart target 200 includes machining an optical material (e.g., glass, a polymer such as poly(methyl methacrylate) (PMMA) and the like, and the like) to provide cylindrical light pipes (222, 224, 238, 240); making an aperture in second light pipe 224 to receive first light pipe 222; disposing second light pipe 224 in the aperture so that first light pipe 222 receives second light pipe 224, wherein first light pipe 222 and second light pipe 224 are in mechanical and optical communication to form elevation member 214; finishing a surface of elevation member 214 to create a surface for peripheral edges 232 to be uniformly illuminated by first light; disposing light sources in optical communication with light pipes (222, 224, 238, 240); disposing elevation arm 228 on azimuthal base 226; disposing elevation member 214 on elevation arm 228; disposing y-axis light pipe 238 on azimuthal base 226; and disposing z-axis light pipe 240 on azimuthal base 226.

The optical material for light pipes (222, 224, 238, 240) provides optical functionality that includes high light guidance and distribution to provide a uniformly bright and sharp edge illumination for peripheral edges 232. Precision machining can be performed on raw rod material to create precision cylinders, e.g., with 20-μm roundness accuracy. Surface finishing can be applied light pipes (222, 224, 238, 240) to provide a matte surface thereto. Ends of light pipes can be optically ground so that an end is connected, e.g., to a light source such as an LED. The other end can be capped with a mirror to retro-reflect the light. In an embodiment, to make elevation member 214, two cylindrical light pipes are joined, wherein a cross-sectional diameter of second light pipe 224 can be, e.g., 5 mm larger than a cross-sectional diameter of first light pipe 222. A hole is drilled through the larger diameter light pipe, and first light pipe 222 is tight-fit into second light pipe 224 to connect first light pipe 222 and second light pipe 224 to form elevation member 214. Surface finishing is performed over the surface of elevation member 214. For first light pipe 222, a central portion of first light pipe 222 is not matte finished. Instead, the central portion can be ground to pass light out of first light pipe 222. The LEI) light source is added to first end 236 of first light pipe 222. After disposing first light pipe 222 into second light pipe 224 by tight-fit, the central portion of first light pipe 222 communicates the first light to second light pipe 224 to illuminate second light pipe 224, wherein elevation member 214 is illuminated by the first light received by first light pipe 222.

The process for making molecular scrivener 200 also can include the assembly of elevation arm on azimuthal base to form gimbal. The elevation arm can be assembled on the azimuthal base. A rotary center provided by an intersection of the azimuthal axis and the elevation axis coincides with the intersection center of the first and second light pipes of the elevation member. The elevation adjuster removes runout offsets of the first and second light pipes intersection center about elevation axis. A runout offset of rotary center 216 of elevation member 214 about azimuthal axis 220 is removed by adjusting azimuthal adjuster 264.

The process for making molecular scrivener 200 also can include mounting orientation sensor on the elevation element. The orientation sensor x-axis is aligned with the first light pipe center line. The elevation adjuster is assembled at the end of the elevation element, connecting to elevation motor shaft. The bearing supports elevation motor shaft on the elevation arm. The elevation motor is mounted on the elevation arm. The azimuthal adjuster is assembled at the end of the elevation arm, connecting to azimuthal motor shaft. The bearing supports the azimuthal motor shaft on the azimuthal base. The azimuthal motor is mounted on the azimuthal base. Y-direction adjuster, z-direction adjuster, and controller are mounted on azimuthal base.

FIG. 12 shows material for first light pipe 222, second light pipe 224, y-axis light pipe 238, and z-axis light pipe 240 for six-dimensional smart target 200. Six-dimensional smart target 200 uses line features of light pipe (222, 224, 238, 240) to define three-dimensional coordinate frame 278 that determines 6-D information about pose of object 210. Three-dimensional coordinate frame 278 includes origin 280, principal x-axis 286, principal y-axis 282, and principal z-axis 284, wherein principal x-axis 286, principal y-axis 282, and principal z-axis 284 are vector elements that include a position and a direction.

Center lines first light pipe 222, second light pipe 224, y-axis light pipe 238, and z-axis light pipe 240 to define vector for principal x-axis 286, principal y-axis 282, and principal z-axis 284 instead of two points per vector. Compared with conventional methods, six-dimensional smart target 200 involves high accuracy line detection by using more points and supporting information. The information of peripheral edges 232 of light pipes (222, 224, 238, 240), parallelism of peripheral edges 232, points for peripheral edges 232 and origin 280, and internal intensity distribution of light are used for centerline detection of light pipes (222, 224, 238, 240). Also, origin 280 is determined from an intersection of two line features (e.g., each 75 mm long) and achieves higher accuracy compared with the conventional methods that use a spherical center to define an origin. Under operation of six-dimensional smart target 200, elevation member 214 can constantly rotate toward the measurement instrument to provide a non-blocking measurement of six-dimensional smart target 200, even when six-dimensional smart target 200 is moving as when six-dimensional smart target 200 is disposed on robot 234, and articulated arm 292 moves. Moreover, a measurement uncertainty provided by six-dimensional smart target 200 remains the same when six-dimensional smart target 200 rotates at different angles, rotation rates, and the like.

Six-dimensional smart target 200 has numerous advantageous and unexpected benefits and uses. In an embodiment, a process for dynamically determining a pose of object 210 with six-dimensional smart target 200 includes: disposing six-dimensional smart target 200 on object 210 so that six-dimensional smart target 200 moves synchronously with object 210; receiving a first image of six-dimensional smart target 200 from first camera 296.1 as shown in FIG. 10; detecting six-dimensional smart target 200 from a background environment in which the six-dimensional smart target 200 is disposed; determining an area of interest of six-dimensional smart target 200; determining peripheral edges 232 of first light pipe 222; determining peripheral edges 232 of second light pipe 224; determining peripheral edges 232 of y-axis light pipe 238; determining peripheral edges 232 of z-axis light pipe 240; determining, from peripheral edges 232 of first light pipe 222, first center line 276.1 of first light pipe 222; determining, from peripheral edges 232 of second light pipe 224, second center line 276.2 of second light pipe 224; determining, from peripheral edges 232 of y-axis light pipe 238, third center line 276.3 of y-axis light pipe 238; determining, from peripheral edges 232 of z-axis light pipe 240, fourth center line 276.4 of z-axis light pipe 240; determining an elevation intersection of first center line 276.1 and second center line 276.2; determining, from the elevation intersection, rotary center 216; determining, from rotary center 216, third center line 276.3, and fourth center line 276.4, three-dimensional coordinate frame 278 for six-dimensional smart target 200 to determine the pose of object 210, three-dimensional coordinate frame 278 including: origin 280 that is disposed at rotary center 216; principal y-axis 282 parallel to y-direction 246 and arranged to intersect origin 280; principal z-axis 284 parallel to z-direction 248 and arranged to intersect origin 280; and principal x-axis 286 parallel to azimuthal axis 220 and arranged to intersect origin 280.

The process for determining pose further can include removing an elevation runoff offset of elevation member 214 for rotation about elevation axis 230 by adjusting elevation adjuster 254 interposed between elevation member 214 and elevation arm 228; and jamming a motion of elevation member 214.

The process for determining pose further can include removing an azimuthal runoff offset of elevation member 214 for rotation about azimuthal axis 220 by adjusting azimuthal adjuster 264 interposed between azimuthal base 226 and elevation arm 228; and releasing a motion of elevation member 214.

The process for determining pose further can include aligning y-axis light pipe 238 by adjusting y-direction adjuster 260 so that y-direction 246 intersects azimuthal axis 220.

The process for determining pose further can include adjusting a position of reflector 274 disposed on elevation member 214 to be disposed coincident rotary center 216 as viewed from motion tracker 288.

In the process, disposing six-dimensional smart target 200 on object 210 so that six-dimensional smart target 200 moves synchronously with object 210 can include using rotation sensor signals to drive elevation motor and azimuthal motor to keep the elevation element maintaining the initial pose or a taught pose.

In the process, receiving a first image of six-dimensional smart target 200 from first camera 296.1 can include initializing the camera connection, performing auto-exposure, capturing image, and storing image in software image buffer.

In the process, detecting six-dimensional smart target 200 from a background environment can include adjusting camera exposure, applying color filters in algorithm to identify light pipes, and using the pattern of three light pipe colors to detect smart target.

In the process, determining an area of interest of six-dimensional smart target 200 can include detecting smart target from a background environment, finding a bounding box of the smart target in image, generating an area of interest using the bounding box, and applying the area of interest for image capturing to increase the camera frame rate.

In the process, determining peripheral edges 232 can include applying noise removal algorithm for image processing, implementing edge detection filter in algorithm to detect edges, and using sub-pixel interpretation for edge representation.

In the process, determining, from peripheral edges 232 center line 276 can include constructing an edge representation to edge line features, calculating a middle line using the edge lines, using intensity information to fine-tune the location of center line points along the direction perpendicular to middle line, best-fit the center line points to a center line.

In the process, determining an elevation intersection of first center line 276.1 and second center line 276.2 can include constructing center lines from the first light pipe and the second light pipe, and calculating the intersection of the two center lines to get a point, which is the origin of the coordinate frame.

In the process, determining three-dimensional coordinate frame 278 can include calculating coordinate frame origin from the intersection of two light pipes in elevation element, then from the origin, creating a vector to represent the y-axis of the coordinate frame. The direction of the y-axis vector is defined by constructing center line from y-axis light pipe, z-axis vector is defined by constructing center line from z-axis light pipe. A coordinate frame is constructed by having an origin and two directions of axes.

In the process, determine the pose of object 210 from coordinate frame can include extracting position information (x, y, z) from the origin of the coordinate frame, and orientation information (pitch, yaw, roll) from the direction of coordinate x-axis, y-axis, and z-axis.

In the process, removing runoff offset can include rotating elevation member about the elevation axis, measuring runoff of the intersection center of the first and second light pipes on elevation element, removing the runoff by adjusting elevation adjuster, then jamming a motion of elevation member about the elevation axis, rotating elevation arm about azimuthal axis, measuring runoff of the intersection center of the first and second light pipes on elevation element, and removing the runoff by adjusting azimuthal adjuster.

In the process, jamming a motion of elevation member 214 can include using a fixture to clamp elevation motor shaft to stop elevation motor from rotating.

In the process, releasing a motion of elevation member 214 can include removing the clamping fixture to resume the rotation of elevation motor.

In the process, aligning y-axis light pipe 238 can include measuring the center line of the y-axis light pipe and z-axis light pipe and adjusting the direction of the y-axis light pipe using y-direction adjuster to align y-axis direction perpendicular to z-axis direction.

In the process, adjusting a position of reflector 274 disposed on elevation member 214 can include adjusting the location of the reflector to make it coincide with the origin or the coordinate frame.

Figure 13:
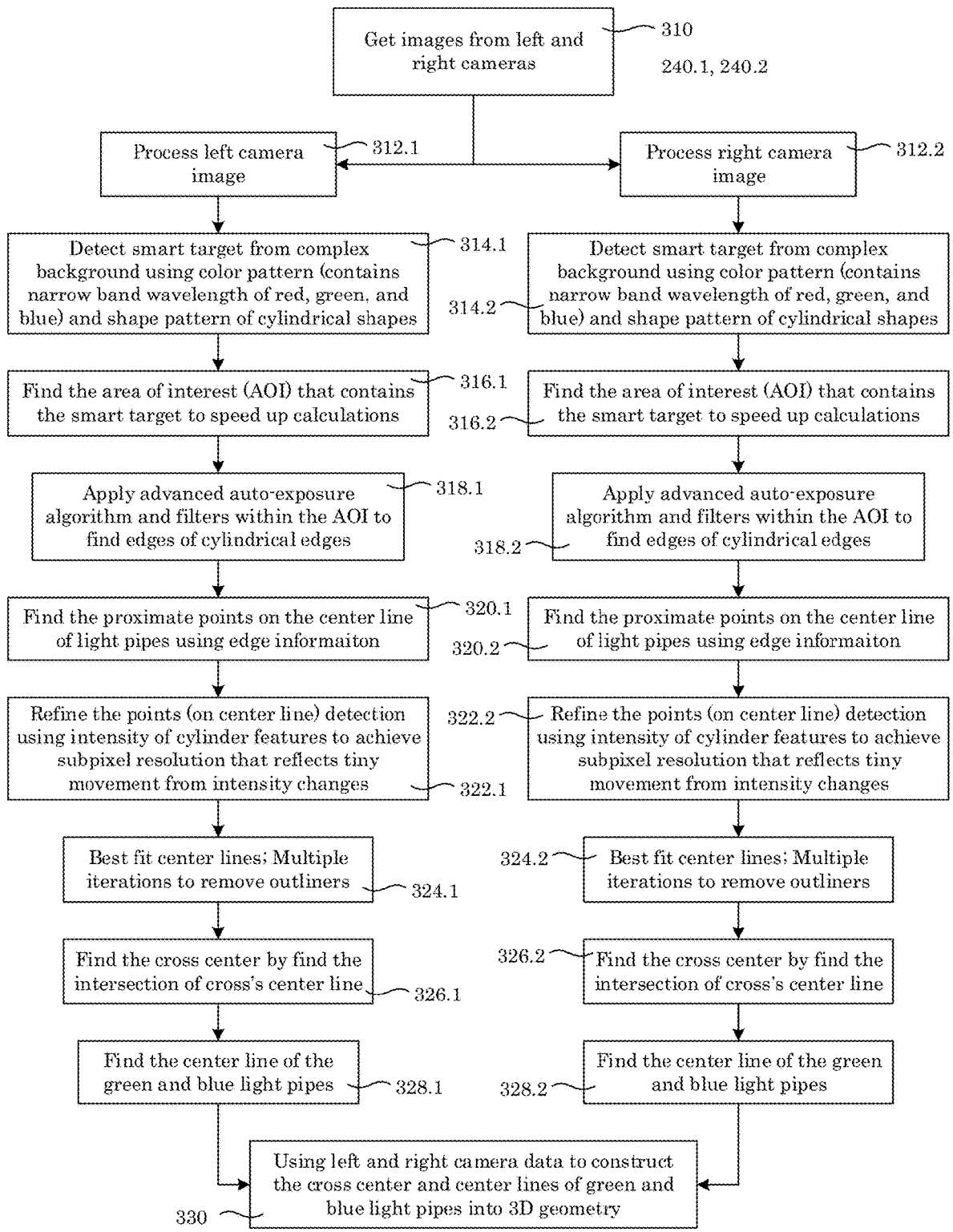
FIG. 13 shows a process for dynamically determining a pose of an object.
Figure 14:
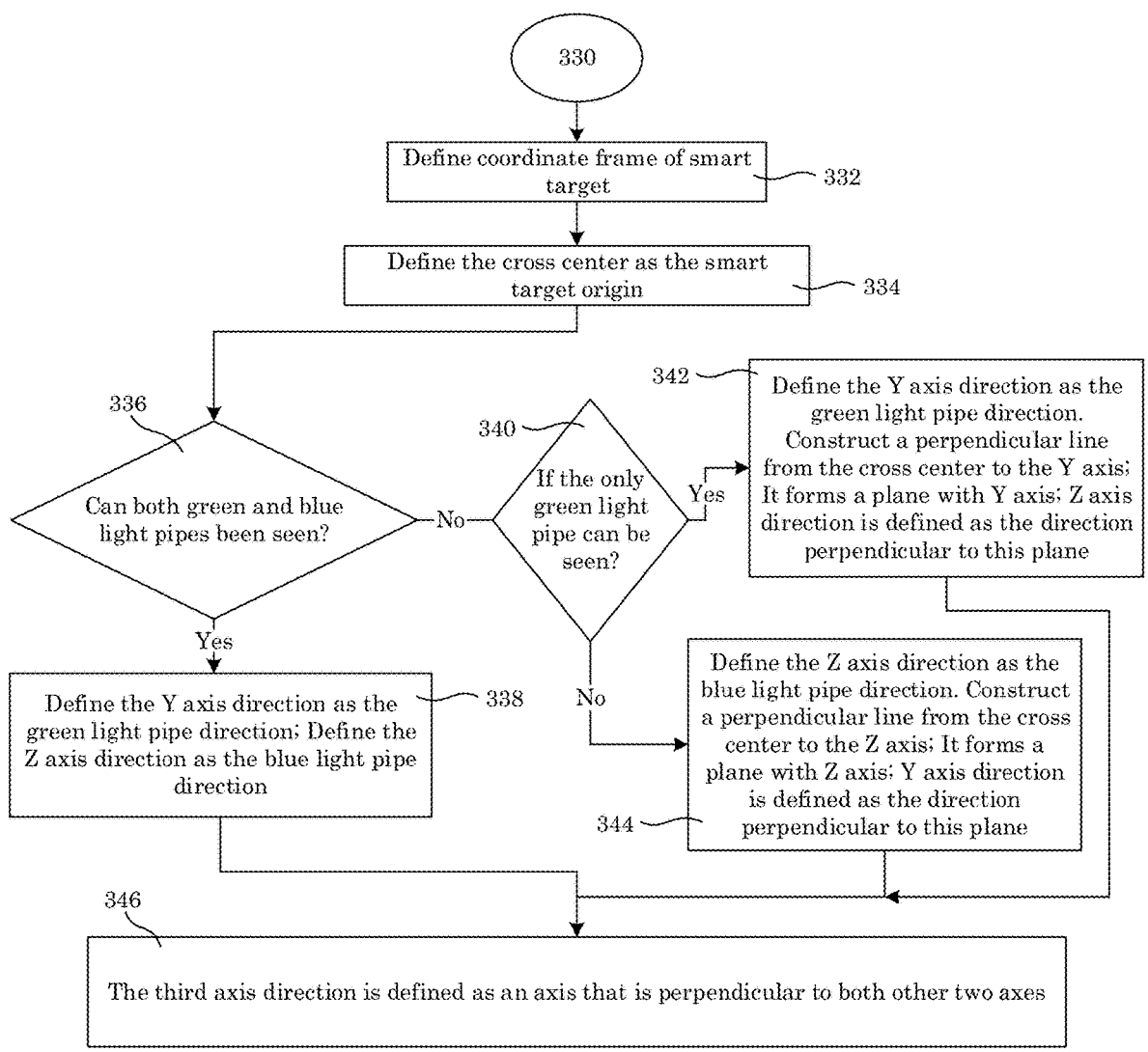
FIG. 14 shows a process for dynamically determining a pose of an object.

With reference to FIG. 13 and FIG. 14, a process for recognizing elevation member 214, y-axis light pipe 238, and z-axis light pipe 240 and also establishing three-dimensional coordinate frame 278 includes measuring, e.g., with a vision-based measurement instrument, six-dimensional smart target 200 with cameras 296 to obtain features; performing stereo triangulations to convert features in 2-D images to 3-D points or features; and processing images for first camera 296.1 and second camera 296.2 as shown in FIG. 10.

A first image from first camera 296.1 is processed (step 312.1), wherein the first image includes a background and six-dimensional smart target 200. A color pattern of six-dimensional smart target 200 includes a narrowband wavelength of red, green, and blue colors. The color pattern is used to create a color pattern filter. Together with a shape pattern of light pipes (222, 224, 238, 240), six-dimensional smart target 200 is identified from the background (step 314.1). Centered by the identified six-dimensional smart target 200, an area of interest (AOI) is created (step 316.1). Advanced algorithms are performed on AOI to speed up calculation because fewer calculations are performed on the smaller area of AOI as compared with processing the whole image (step 318.1). An advanced auto-exposure algorithm and filters are applied to AOI to find peripheral edges 232 of light pipes (222, 224, 238, 240). Here, camera parameters, including shutter speed and gain, are adjusted to achieve the intensity partition of the selected wavelength to background. For elevation member 214, peripheral edges 232 are identified for the intersection of first light pipe 222 and second light pipe 224. Using information for peripheral edges 232, points on the center line of first light pipe 222 and second light pipe 224 are determined (step 320.1). It is contemplated that a movement of object 210 can be less than a representation that a resolution of a camera pixel might have, but such motion can be reflected by an intensity change. Intensity information is used to refine center line detection to achieve a sub-pixel accuracy of the center line (step 322.1). Here, edge line features are constructed. A middle line is created using the edge lines. Intensity information of the light pipe image is used to fine-tune the location of center line points along the direction perpendicular to middle line with sub-pixel accuracy. Best-fit is performed to fit the center line points to a center line. Refined center points are used to best-fit the center line of light pipes (222, 224, 238, 240) (step 324.1). Multiple iterations and an optimization algorithm remove outliers and points that have high uncertainty. Rotary center 216 of elevation member 214 is origin 280 for three-dimensional coordinate frame 278 of six-dimensional smart target 200 (step 326.1), wherein rotary center 216 is determined from the intersection of the center lines of first light pipe 222 and second light pipe 224. Center lines of y-axis light pipe 238 and z-axis light pipe 240 are used as y-direction 246 and z-direction 248 (step 328.1).

A second image from second camera 296.2 is processed according to the process for processing the first image from first camera 296.1 (steps 312.2-328.2). Triangulation is performed with the first image and the second image to construct, from detected features, a 3-D point and lines (steps 330, 332). Rotary center 216 from elevation member 214 is defined as origin 280 of six-dimensional smart target 200 (step 334). Coordinate axes are identified by, if y-axis light pipe 238 and z-axis light pipe 240 can be viewed by camera 296, making y-direction 246 as the direction of the center line of y-axis light pipe 238 and making the z-direction 248 as the direction of the center line of z-axis light pipe 240 and projecting y-direction 246 and z-direction 248 into a plane parallel to y-direction 246 and z-direction 248 and including origin 280 to make principal y-axis 282 and principal z-axis 284.

If only y-axis light pipe 238 is viewable by camera 296, y-direction 246 is defined as the direction of the center line of y-axis light pipe 238, and principal x-y plane 284 is made by projecting y-direction 246 onto a plane parallel to y-direction 246 and including origin 280. Principal z-axis is defined as a vector passing through the origin, and perpendicular to the principle x-y plane.

If only z-axis light pipe 240 is viewable by camera 296, z-direction 248 is define as the direction of the center line of z-axis light pipe 240, and principal x-z plane 284 is made by projecting z-direction 246 onto a plane parallel to z-direction 246 and including origin 280. Principal y-axis is defined as a vector passing through the origin, and perpendicular to the principle x-z plane.

After origin 280, principal y-axis 282, and principal z-axis 284 are defined, principal x-axis 286 is defined to be perpendicular to principal y-axis 282, and principal z-axis 284.

Y-axis light pipe 238 can be larger in diameter than other light pipes (222, 224, 240) and defines y-direction 246, a positive direction of the Y-axis. The positive Y axis direction point from base azimuth rotation center points to a distal terminus of y-axis light pipe 238. A positive X axis direction is in a direction from base azimuth rotation center pointing to rotary center 216 of elevation member 214.

With origin 280 and direction of axes defined, three-dimensional coordinate frame 278 of six-dimensional smart target 200 is as follows. Origin 280 is at rotary center 216 of elevation member 214. Principal y-axis 282 passes through origin 280, and points in a positive direction defined by y-axis light pipe 238. Principal z-axis 284 passes through origin 280 and points in a direction defined by z-axis light pipe 240. Principal x-axis 286 is perpendicular to principal z-axis 284 and principal y-axis 282. The positive direction is defined as pointing from the rotary center of azimuthal base 226 to elevation member 214.

Figure 15:
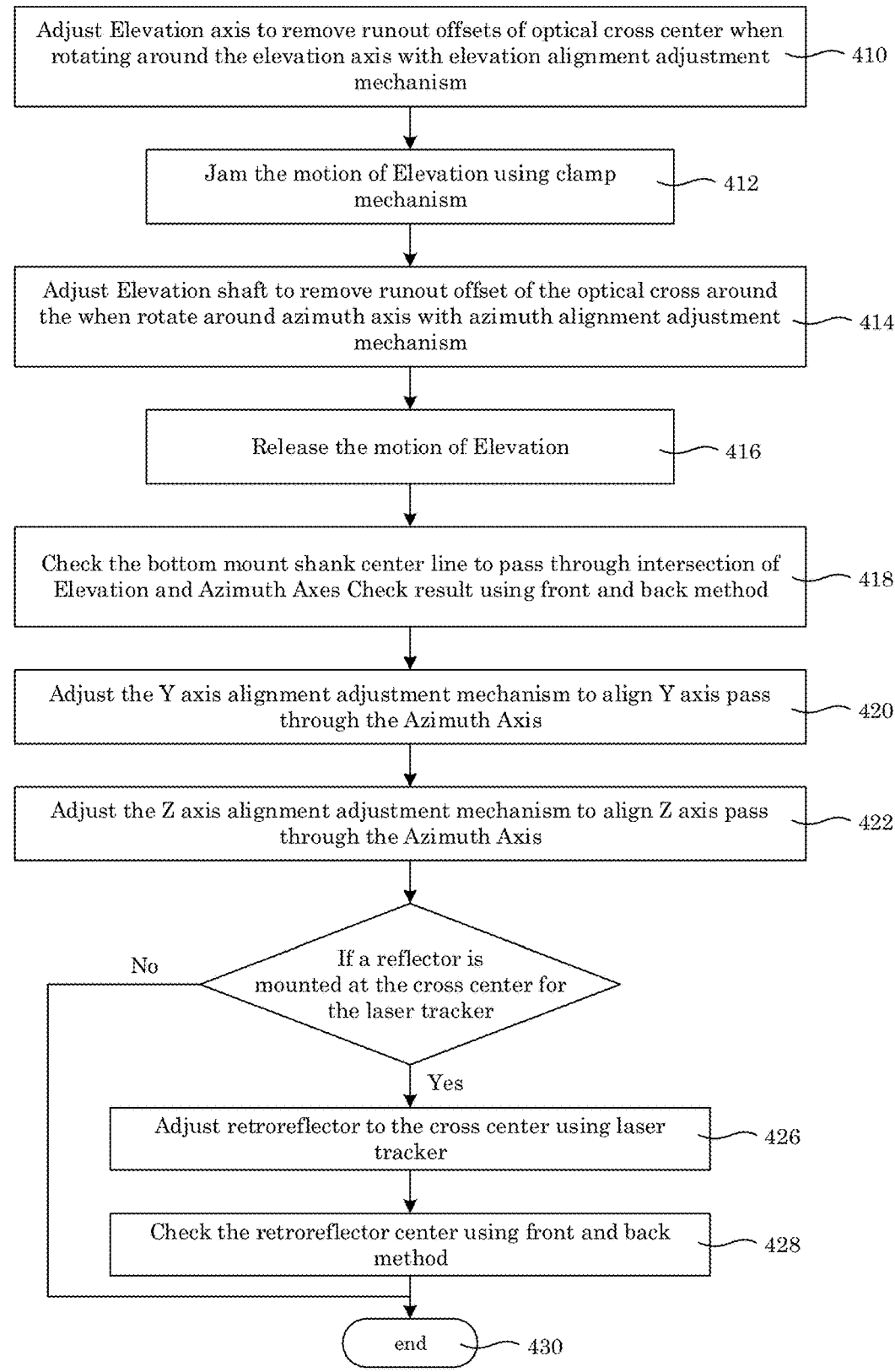
FIG. 15 shows a process for adjusting elements of a six-dimensional smart target.

FIG. 15 shows a process for adjusting elements of six-dimensional smart target 200. Alignment of elevation member 214 causes elevation member 214 to stay at the intersection of elevation axis 230 and azimuthal axis 220. When elevation member 214 rotates solely about elevation axis 230 azimuthal axis 220, rotary center 216 of elevation member 214 stays at the same position under rotation. Otherwise, offset errors from alignment occur as the pose of object 210 changes. Y-axis light pipe 238 and z-axis light pipe 240 are aligned to be perpendicular to each other and are the primary definition of directions for two axes. Alignment of y-axis light pipe 238 and z-axis light pipe 240 to pass through azimuthal axis 220 provides advantages of using rotary center 216 of elevation member 214 and information about an axis to define three-dimensional coordinate frame 278 according to the process shown in FIG. 13 and FIG. 14.

Adjustment starts from elevation axis 230. Elevation adjuster 254 removes a runout offset of rotary center 216 of elevation member 214 when rotating about elevation axis 230 after which motion of elevation is jammed with a clamp to immobilize elevation member 214 with elevation arm 228. Azimuthal adjuster 264 removes the runout offset of rotary center 216 of elevation member 214 when rotating about azimuthal axis 220. Thereafter, motion of elevation is released by removing the clamping fixture to resume the rotation of elevation motor. Verification that elevation member 214 passes through the intersection of azimuthal axis 220 and elevation axis 230 is performed by measuring a current position of rotary center with a subsequent rotation of about azimuthal axis by 180° followed by rotating 180° about elevation axis 230. If there is an offset in any direction, the front and back method will double the errors so that problem of the alignment is highlighted and corrected accordingly through adjustment, referred to as a front and back method. The front and back method measures a current position of rotary center 216 with a subsequent rotation about azimuthal axis 220 by 180° followed by rotating 180° about elevation axis 230. If there is an offset in any direction, the front and back method will double the errors so that problem of the alignment is highlighted and corrected accordingly through adjustment.

Alignment of y-axis light pipe 238 so that y-direction 246 intersects azimuthal axis 220 is performed by y-direction adjuster 260. Similarly, alignment of z-axis light pipe 240 so that z-direction 248 intersects azimuthal axis 220 is performed by z-direction adjuster 262. Adjusting y-direction adjuster 260 or z-direction adjuster 262 occurs by adjusting the direction of the y-axis light pipe using y-direction adjuster to align y-axis direction perpendicular to z-axis direction or adjusting the direction of the z-axis light pipe using z-direction adjuster to align z-axis direction perpendicular to y-axis direction. When present, reflector 274 can be aligned by adjusting reflector 274 to be interposed between rotary center 216 and a laser tracker, wherein alignment reflector 274 can be verified using the front and back method with respect to reflector 274 as viewed by the laser tracker.

Six-dimensional smart target 200 and processes disclosed herein have numerous beneficial uses, including the high accuracy that comes from the design herein, non-blocking measurement by rotating the target constantly toward the measurement instrument, the capability to measure both static and dynamic TCP data, the consistent and unique definition of a coordinate frame of reference to remove measurement uncertainty, and a hybrid target for the cross-platform measurement system, including vision-base measurement systems and laser-vision hybrid measurement systems. Advantageously, six-dimensional smart target 200 overcomes limitations of technical deficiencies of conventional articles such as uncertainty in high accuracy orientation measurement, blocking issue for dynamic measurement, and lack of a unique definition of a coordinate frame of reference. Further, ambient light has a high influence on accuracy when using traditional infrared (IR) technology to distinguish target from background environment. Images using IR technology only contains markers that cannot distinguish the target from reflective lights. The active lighted three-color smart target allows the frame of reference to stand out from background environment, enabling more accurate measurements. Redundant information from color images are used to remove ambient lights influences and ensure the clear delineation of the frame of reference, ensuring more accurate measurements. The rotating nature of the target ensures that there is a clear vision of the target, allowing for the measurement at multiple orientation and positions without the risk of occlusion.

Six-dimensional smart target 200 overcomes shortcomings of conventional devices by using line features of light pipes to define three-dimensional coordinate frame 278. In conventional devices, a frame is constructed by defining an origin and two of the axes. A third axis is defined as being perpendicular to the other two axes, and an origin of the frame of the conventional device is a point feature. Conventionally, a coordinate frame is a made by a three-point method in which three or more sphere artifacts are structured together, and centers of the sphere artifacts are used in the three-point method for coordinate frame definition. The three points are used as the origin, the point defining an axis (e.g., X-axis), and the point in a plane (e.g., XY plane). Because the axis vector is only defined by two points at close distance, the uncertainty of the point center detection can cause large uncertainty in the axis direction definition. As a result, the conventional device can have a tremendous uncertainty in orientation measurement. Moreover, blocking or overlapping can occur in the conventional device from different views of the conventional device, or when the conventional device rotates with an object of interest. Different spheres are selected to redefine the origin and axes in the conventional device, and the process is inconsistent with additional errors of frame position and orientation definition. Six-dimensional smart target 200 overcomes these technical limitations.

Moreover, six-dimensional smart target 200 and processes herein have numerous advantageous properties. In an aspect, six-dimensional smart target offers unique advantages in supporting a vision system's ability to capture precise 6-D information of an object that requires precision localization. Capturing both the accurate position and the orientation of an object is involved in a variety of applications, including registering multiple machines, tools, or objects, adaptively locating objects during mobile applications, or precisely tracking the pose of an object, including objects used within robot or machine operations. In many of these applications, even a very small error in position and pose can result in significant cost in the production process, due to rework and product failures.

Six-dimensional smart target 200 and processes herein unexpectedly provide high accuracy, non-blocking dynamic measurement, and a low-cost solution to acquire 6-D information that is involved in many applications that involve measuring and monitoring the pose of an object or using precision 6-D information to merge measurement data. Conventional processes may not adequately account for occlusions and blocking. The tracked object can be in positions or orientations that do not provide tracking. At these locations, the user of conventional processes cannot be confident that the object is at the expected position or pose, creating an uncertainty in the measurement process. Moreover, six-dimensional smart target 200 can be a general target for vision agnostic systems, providing wide capabilities of monitor the performance degradation or tracking the pose of objects.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A six-dimensional smart target for dynamically determining pose of an object, the six-dimensional smart target comprising:
   a gimbal comprising:
      an azimuthal base that provides an azimuthal axis;
      an elevation arm disposed on and in rotary communication with the azimuthal base and that:
         extends from the azimuthal base,
         rotates about the azimuthal axis, and
         provides an elevation axis; and
      a rotary center provided by an intersection of the azimuthal axis and the elevation axis;
   an elevation member disposed on the elevation arm of the gimbal at the rotary center of the gimbal and in rotary communication with the elevation arm, the elevation member comprising:
      a first light pipe comprising an elongated body disposed axially along the elevation axis with a first end connected to the elevation arm and that:
         receives first light and uniformly distributes the first light along the first light pipe to illuminate peripheral edges of the first light pipe; and
      a second light pipe disposed on the first light pipe and arranged with the second light pipe intersecting the first light pipe at the rotary center such that the second light pipe receives the first light from the first light pipe and uniformly distributes the first light along the second light pipe to illuminate peripheral edges of the second light pipe, the second light pipe comprising an elongated body disposed axially at an oblique angle to the first light pipe and the elevation axis;
   an azimuthal member comprising:
      the azimuthal base;
      a y-axis light pipe disposed on the azimuthal base and comprising an elongated body disposed axially along a y-direction that is perpendicular to the azimuthal axis with a second end connected to the azimuthal base and that:
         receives a second light and uniformly distributes the second light along the y-axis light pipe to illuminate peripheral edges of the y-axis light pipe; and
      a z-axis light pipe disposed on the azimuthal base and comprising an elongated body disposed axially along a z-direction that is perpendicular to the azimuthal axis and the y-direction, with a third end connected to the azimuthal base such that the z-axis light pipe:
         receives a third light and uniformly distributes the third light along the z-axis light pipe to illuminate peripheral edges of the z-axis light pipe,
      wherein the elevation member rotates at the rotary center about the elevation axis and the azimuthal axis to consistently maintain the first light pipe and the second light pipe in a field of view of a measurement instrument that views the six-dimensional smart target.

2. The six-dimensional smart target of claim 1, further comprising an orientation sensor interposed between the elevation member and the elevation arm.

3. The six-dimensional smart target of claim 1, further comprising an elevation adjuster interposed between the elevation member and the elevation arm.

4. The six-dimensional smart target of claim 1, further comprising a bearing interposed between the elevation member and the elevation arm.

5. The six-dimensional smart target of claim 1, further comprising an elevation motor interposed between the elevation member and the elevation arm.

6. The six-dimensional smart target of claim 1, further comprising a y-direction adjuster interposed between the azimuthal base and the y-axis light pipe.

7. The six-dimensional smart target of claim 1, further comprising a z-direction adjuster interposed between the azimuthal base and the z-axis light pipe.

8. The six-dimensional smart target of claim 1, further comprising an azimuthal adjuster interposed between the azimuthal base and the elevation arm.

9. The six-dimensional smart target of claim 1, further comprising a bearing interposed between the azimuthal base and the elevation arm.

10. The six-dimensional smart target of claim 1, further comprising an azimuthal flange disposed on the azimuthal base that connects the azimuthal base to the object.

11. The six-dimensional smart target of claim 1, further comprising a controller disposed on the azimuthal base.

12. The six-dimensional smart target of claim 1, further comprising an azimuthal motor disposed on the azimuthal base.

13. The six-dimensional smart target of claim 1, further comprising a reflector disposed on the elevation member proximate to and centered on rotary center.

14. A process for dynamically determining a pose of an object with the six-dimensional smart target of claim 1, the process comprising:
   disposing the six-dimensional smart target on object so that six-dimensional smart target moves synchronously with object;
   receiving a first image of the six-dimensional smart target from a first camera;
   detecting the six-dimensional smart target from a background environment in which the is disposed;
   determining an area of interest of the six-dimensional smart target;
   determining peripheral edges of the first light pipe;
   determining peripheral edges of the second light pipe;
   determining peripheral edges of the y-axis light pipe;
   determining peripheral edges of the z-axis light pipe;
   determining, from the peripheral edges of the first light pipe, a first center line.1 of first light pipe;
   determining, from the peripheral edges of the second light pipe, a second center line.2 of second light pipe;
   determining, from the peripheral edges of the y-axis light pipe, a third center line.3 of y-axis light pipe;
   determining, from the peripheral edges of the z-axis light pipe, a fourth center line.4 of z-axis light pipe;
   determining an elevation intersection of the first center line.1 and the second center line.2;
   determining, from the elevation intersection, the rotary center;
   determining, from the rotary center, the third center line.3, and the fourth center line.4, a three-dimensional coordinate frame for the six-dimensional smart target to determine the pose of the object, the three-dimensional coordinate frame comprising:
      an origin that is disposed at the rotary center;
      a principal y-axis parallel to the y-direction and arranged to intersect the origin;
      a principal z-axis parallel to the z-direction and arranged to intersect the origin; and
      a principal x-axis parallel to the azimuthal axis and arranged to intersect the origin.

15. The process for determining pose of claim 14, further comprising:
   removing an elevation runoff offset of the elevation member for rotation about the elevation axis by adjusting an elevation adjuster interposed between the elevation member and the elevation arm; and
   jamming a motion of the elevation member.

16. The process for determining pose of claim 15, further comprising:
   removing an azimuthal runoff offset of the elevation member for rotation about the azimuthal axis by adjusting an azimuthal adjuster interposed between the azimuthal base and the elevation arm; and
   releasing a motion of the elevation member.

17. The process for determining pose of claim 16, further comprising:
   aligning y-axis light pipe by adjusting y-direction adjuster so that y-direction intersects the azimuthal axis.

18. The process for determining pose of claim 15, further comprising:
   adjusting a position of a reflector disposed on the elevation member to be disposed coincident with rotary center as viewed from a motion tracker.

* * * * *